United States Patent
Womack et al.

[19]

[11] Patent Number: 5,982,819
[45] Date of Patent: Nov. 9, 1999

[54] MODULATION FORMAT ADAPTIVE MESSAGING RECEIVER AND METHOD THEREOF

[75] Inventors: James E. Womack, Bedford; John B. Gehman, Trophy Club; E. Martin Hermesch, Aledo; Steven J. Goldberg, Fort Worth, all of Tex.

[73] Assignee: Motorola, Inc., Schaumburg, Ill.

[21] Appl. No.: 08/717,594

[22] Filed: Sep. 23, 1996

[51] Int. Cl.$^6$ .............................. H03K 9/00; H04L 27/06; H04L 27/14; H04L 27/22

[52] U.S. Cl. ........................ 375/316; 375/259; 370/204; 455/142; 455/93; 395/892

[58] Field of Search ...................................... 370/204, 468; 375/261, 316, 259; 455/84, 93, 142, 461–462, 503; 364/724.19; 395/892

[56] References Cited

U.S. PATENT DOCUMENTS

| | | | |
|---|---|---|---|
| 4,731,796 | 3/1988 | Masterton et al. ....................... | 375/261 |
| 5,239,306 | 8/1993 | Siwiak et al. . | |
| 5,497,401 | 3/1996 | Ramaswamy et al. .................. | 375/341 |
| 5,537,398 | 7/1996 | Siwiak ..................................... | 370/204 |
| 5,671,253 | 9/1997 | Stewart ................................... | 375/316 |
| 5,680,102 | 10/1997 | Xydis ...................................... | 340/539 |

OTHER PUBLICATIONS

Mitola, Joe; IEEE Communications Magazine; May 1995; vol. 33, No. 5; "The Software Radio Architecture"; pp. 26–38.

*Primary Examiner*—Stephen Chin
*Assistant Examiner*—Michael W. Maddox
*Attorney, Agent, or Firm*—Charles W. Bethards

[57] ABSTRACT

A messaging receiver (400) and corresponding system (100b) and method adaptable to a plurality of modulation formats including; a processor (401) having flexible resources (404), preferably software based, for receiving a signal to provide a modulation identifier, and a controller (403), coupled to the processor, for deploying the flexible resources responsive to the modulation identifier. Alternatively the messaging receiver includes a buffer (412) for storing a signal having a modulation format, and the processor processes the signal in accordance with the plurality of modulation formats so as to differentiate the modulation format, and the controller deploys the flexible resources responsive to the modulation format.

16 Claims, 6 Drawing Sheets

MODULATION FORMAT ADAPTIVE MESSAGING RECEIVER AND METHOD THEREOF

FIELD OF THE INVENTION

This invention relates to messaging systems, and more particularly to a modulation format adaptive messaging receiver that receives messages in such systems employing a variety of different modulation formats.

BACKGROUND OF THE INVENTION

Messaging systems are ordinarily designed to operate with a given modulation format. Personal messaging units (PMU's) or subscriber units that operate on the messaging system are designed to operate with this given modulation format. Very often a second, even neighboring, messaging system including it's corresponding PMUs will operate with or on a different modulation format. Because of the distinct modulation formats PMUs from these two systems will not be able interoperate on either system or operate on the neighboring system.

One solution that has been proposed is the adoption of an open architecture modulation format and protocol. If this were adopted by all messaging systems PMUs could interoperate on any system, subject to certain administrative formalities. Thus one open architecture modulation format could be utilized for all regional based messaging systems or effectively one wide area messaging systems. Various reasons such as the fast and ever changing user needs and telecommunications technology necessitating more capable modulation formats or the need to grandfather or accommodate existing formats have resulted in many practical obstacles to the wide scale success of standard modulation formats.

Additionally the advent of two-way messaging systems employing a forward or "outbound" radio frequency channel for message delivery to the PMU's or subscriber units and a reverse or "in-bound" channel for acknowledgments or the like has created even greater opportunity, if not necessity, for modulation format differences. The modulation formats may vary, justifiably, between forward and reverse channels or between data, voice, video or a combination of such messaging services.

In addition, some system operators have one way systems and were unable to obtain licenses for an inbound frequency that would allow them to offer two way services. These operators are driven to provide two way services, such as delivery guarantees and the like, using spectrum for the inbound channel from common spectrum allocations such as the ISM band of frequencies. The ISM band has been authorized by the Federal Communications Commission for general use so long as certain rules, such as power level limits, are followed and proscribed modulation formats are followed. Similar spectral authorizations are available in many other countries.

At the same time the greater mobility of the general population virtually mandates that a given PMU operate on a plurality of messaging systems and this trend seems to be growing. Clearly a need exists for a messaging system and receiver that is adaptable to varying modulation formats and corresponding methods of so adapting.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
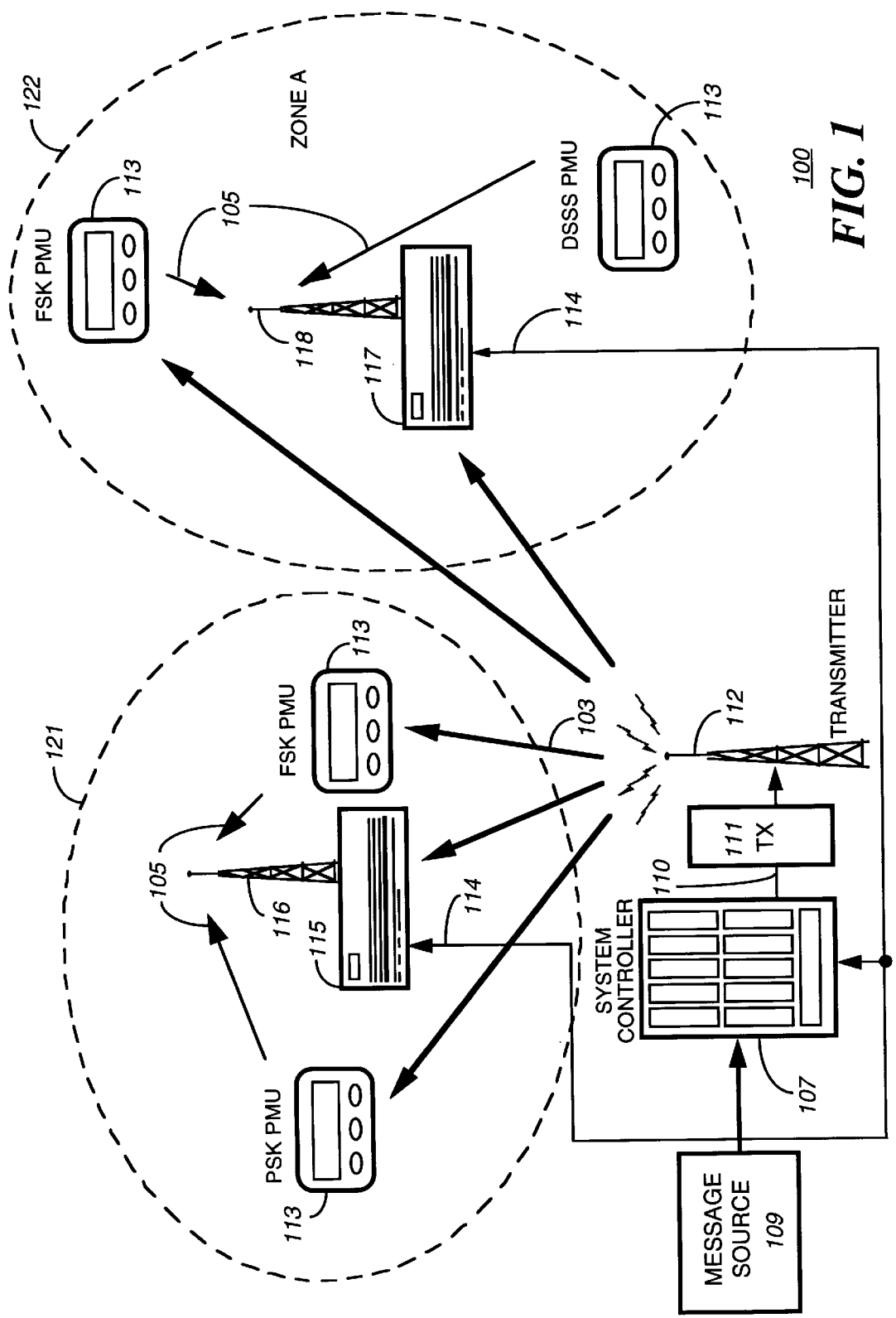
FIG. 1 depicts in exemplary form, a messaging system in accordance with the present invention.

Referring now to FIG. 1, a selective messaging system (100) arranged to provide selective messaging service to a plurality of service areas including service areas (121, 122) is shown together with a plurality of PMUs (113). The system has a forward or outbound radio channel 103, preferably in the 928 to 945 MHz band and a reverse or inbound radio frequency channel 105 within the 901–902 MHz or 902–928 MHz ISM band. The reverse channel 105 preferably, and forward channel conceptually, may employ multiple modulation formats such as frequency shift keyed (FSK), Phase shift keyed (PSK), frequency hopped spread spectrum (FHSS), direct sequence spread spectrum (DSSS), various forms of amplitude modulation, etc. The PMUs (113) are preferably arranged and constructed to receive a common modulation format, such as an FSK format on the forward channel, although the inventive principles are equally applicable to a forward channel employing multiple modulation formats. The PMUs are further arranged to transmit one of the plurality of modulation formats on the reverse channel.

The messaging system (100), like many two-way selective messaging systems, is comprised of four main infrastructure components or elements: a system controller (107) coupled to a message source or terminal (109), one or more transmitters, such as transmitter (111) depicted, and one or more base receivers such as base receivers (115 117). It will be understood that a typical messaging system infrastructure normally includes multiple transmitters and base receivers and that these transmitters and receivers can operate under control of the controller in a simulcast or directed delivery mode. When several messaging systems are networked together such as for national continuous coverage, it is common, to link multiple messaging terminals and systems controllers together with either public or private switched telephone networks, satellite networks or the like. The objective or utility of the messaging system (100) is to selectively deliver or forward messages made available from the message source to a selected PMU(s) and similarly to forward messages such as acknowledgments or PMU originated messages to their destinations.

As an overview the system controller (107) is coupled to and receives messages from the message source. The system controller is further coupled to, via link (110), and arranged and constructed for controlling a plurality of transmitters, such as transmitter (111). The transmitter (111) at a designated time, established by the controller, operates to transmit a forward channel signal corresponding to a message in a modulation format suitable for reception by a selective messaging receiver or PMU. The base receivers (115, 117) are coupled to the controller by network channel (114), include flexible resources, and operate to receive from antenna (116, 118), preferably including a modulation identifier from the forward channel or alternatively from the network channel but also alternatively from the reverse channel, a message indicative of a modulation format. Having received this message and recognizing its corresponding modulation format the flexible resources are configured in accordance with this modulation format and the base receiver receives a reverse channel signal with this modulation format that originated from the selective messaging receiver in order to provide a received signal to the system controller over network channel (114).

The messaging source includes a messaging terminal (not specifically depicted) such as the Motorola Wireless Messaging Gateway™ (WMG) Model PT1069A. The Wireless Messaging Gateway™ typically includes an electronic switching system which is interfaced to users via one or more networks such as telephone service networks including dialup telephone circuits for voice communications, digital circuits, packet network circuits, information system networking circuits such as LAN, WAN, etc. The WMG™ messaging terminal typically interfaces to higher levels of telecommunications media such as T1 telecommunications networks in North America (E1 telecommunications networks in many countries) with the aid of distributed Universal Communications Controllers available from Motorola.

The system controller is similar to the Motorola RF Conductor™ Models PT1075A, PT1076A, and PT1077A, but modified to implement the inventive principles discussed herein. The systems controller is designed to maintain the overall operations and schedules of the radio frequency transmissions and receptions. Some of the functions of the systems controller include: scheduling of all inbound and outbound transmissions in accordance with protocols, Isolation of subscriber units for access by a single transmitter to achieve frequency re-use, assure delivery (retransmitting based on system parameters), logging non-delivery transactions and reason codes, etc. back to the messaging source, storing of messages until successful delivery is achieved or a time out threshold (during which several retransmission attempts occur) is exceeded, support of the requirements for messaging protocols such as FLEX™ and others, batching and queuing of messages while minimizing message latency, coordination of simulcast and targeted or reuse operations, fragmentation of data too large to be delivered in a contiguous form, retransmittal of any fragments encountering an error condition, remotely interfacing of transmitter and base receiver operations to monitor their status, collection of statistics to effectively maintain ongoing operations or proposed modifications.

The transmitter (111) is preferably a Motorola RF Orchestra™ Models PT1052A, PT1054A, PT1055A, and PT1056A, but is available from other manufacturers as well. So as to avoid undue clutter and because it is generally known, the timing reference system such as the GPS system, that is typically used to maintain system synchronization to the degree that may be required for simulcast operation has not been depicted in FIG. 1.

While the preferred embodiment is a selective messaging system it will be clear that the inventive apparatus and methods discussed herein are equally applicable to many other forms of communications or messaging systems.

Figure 4:
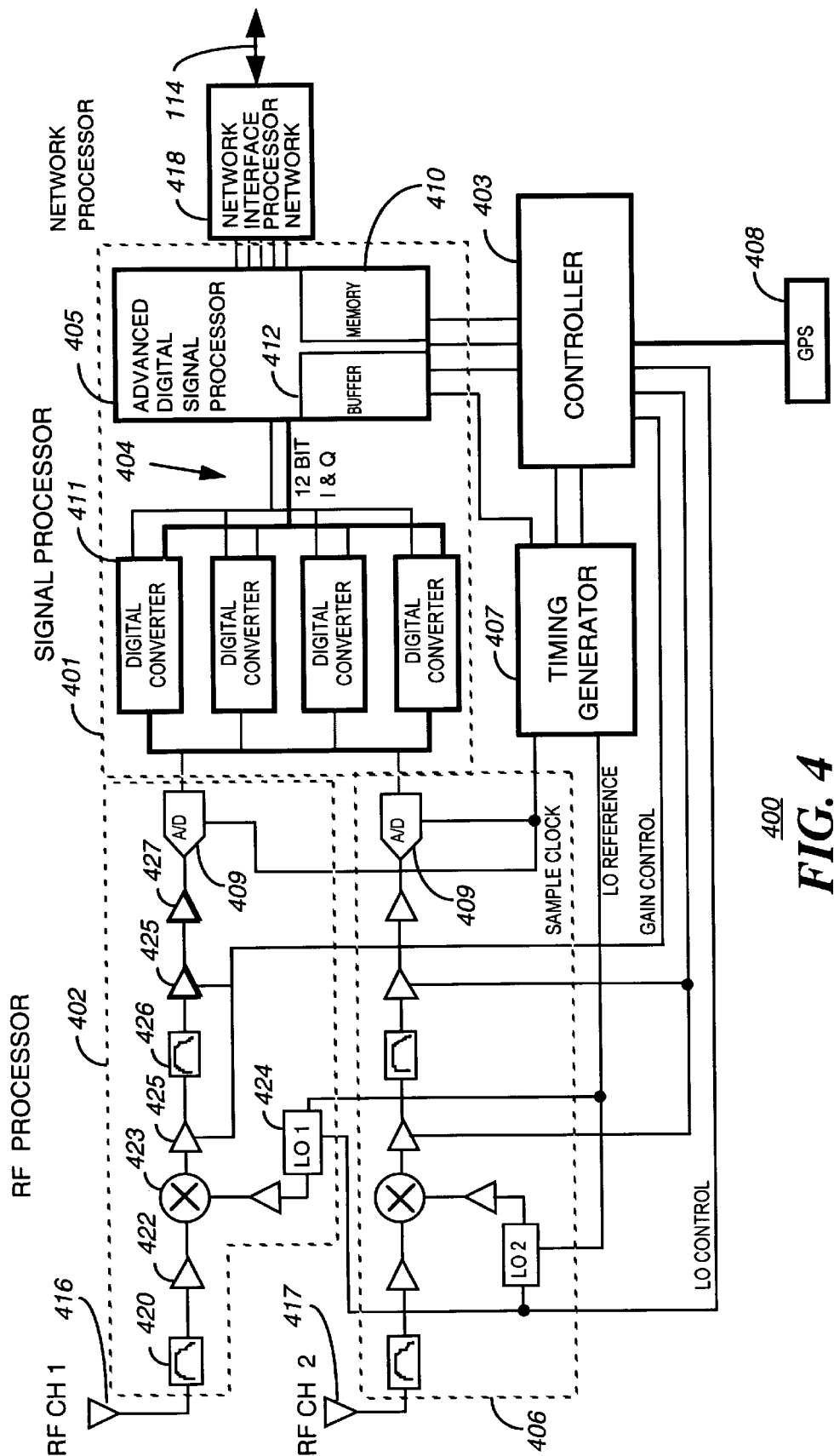
FIG. 4 depicts a preferred block diagram of a messaging receiver in accordance with the present invention.

Referring to FIG. 4, a messaging receiver (400) is shown. It relies on a general, programmable signal processing architecture and an intelligent, fast-reacting operating system to accomplish its goals. It must be able to receive over multiple forward and reverse channels and handle virtually any modulation type. To do this, the analog IF signal must be sampled at a high data rate and fed to programmable down converters that recover the base band data. At base band, a digital signal processor (DSP) is ready with the necessary algorithms pre-stored in resident memory to demodulate and decode the data. The number of messaging protocols or modulation formats the receiver can demodulate or recover is limited by the computational power of its DSP based processor and the size of its memory. In any event, the recovered message is routed back to the controller through the network processor or network interface.

The receiver is preferably used in the base receivers (115, 117), but may alternatively be employed in the PMU (113). The messaging receiver is adaptable to a plurality of modulation formats such as those earlier mentioned. The receiver includes a processor (401) that further includes a Digital Signal Processor (DSP) (405) that may include a plurality of DSPs, a memory (410), a buffer (412), and one or more digital converters (411). This processor is coupled to one or more antennas (416, 417) by one or more radio frequency circuits (402, 406) as depicted and includes flexible resources (404) all arranged for receiving a signal to provide a modulation format that in a preferred form is a modulation identifier identifying a modulation format. In addition, the messaging receiver includes a controller (403) which is coupled to the processor (401), a timing generator (407), and optionally a global positioning system (GPS) receiver (408). The controller (403) is responsive to the modulation identifier or format and is utilized for deploying the flexible resources (404) and radio frequency circuits in accordance therewith. With the flexible resources deployed in accordance with the modulation identifier or format, the receiver may receive further signals having corresponding modulation formats.

The receiver receives signals, preferably a radio frequency signal, from a channel preferably a radio frequency channel, specifically the forward channel 103 where the signal has originated at the transmitter (111). Alternatively the receiver may receive a radio frequency signal from the reverse channel 105 where the signal originated from a PMU 113. This radio frequency signal once received via the antenna (416), is coupled to radio frequency circuitry (402) and then distributed on to the processor (401). The radio frequency circuits include an analog to digital converter (A/D) (409) and operate to convert the radio frequency signal to a signal, an amplified IF signal, and then via A/D (409) a digital signal, that the processor (401) may further process. As a further alternative the receiver may receive a signal from the network channel (114) via a network interface processor (418) that is coupled to the processor (401). This signal from the network channel is used to convey a modulation identifier that is used to then deploy the flexible resources so as to receive signals on the radio channels having a corresponding modulation format.

The radio frequency circuits (402, 406), two depicted and three preferred operate on a radio frequency signal coupled from the antenna to pre-select a band of radio signals and then a particular signal and convert that radio frequency signal to a lower frequency radio signal and finally and preferably, a digital signal or signal that the processor may operate on. The radio frequency circuits include inter coupled as shown well known analog receiver functions such as a pre-selector filter (420), amplifier (422), a mixer (423) a local oscillator (424), intermediate frequency amplifiers (425, 427), filter (426), ending with the A/D converter (409). This pre-selection of bands and a signal by the radio frequency circuits is undertaken due to practical limitations of presently available processing resources, such as DSPs.

The radio frequency circuits help to lower the processing load on or otherwise compensate for limitations in processing capacity, dynamic range, and noise performance of the DSPs. As advances are made in DSP technology it is likely that more and more of the functionality of the radio frequency circuits will be implemented in the processor (401). At present, given the performance limitations of DSPs, radio frequency signals at higher frequencies are less likely to be implemented in DSPs. Band splits, preferably, correspond to the forward channel, the reverse channel, and a wide band version corresponding to a spread spectrum signal on the reverse channel. Preferably, the forward channel for the selective messaging system lies within the 928 to 945 MHz range while the reverse channel lies within the 901 to 928 MHz band when the ISM band is included.

The analog to digital converter (409), samples the analog signal, centered at 70 MHz at a rate of approximately 25 million samples per second and then converts these samples to 12 bit digital words that are coupled to the plurality of digital converters (411) within the processor (401). The digital converters (411) are digital down-converters, preferably, an Analog Devices Model AD-6620 or AD-6640, These digital down-converters operate at 65 Million Samples per second, and offer numerically controlled oscillators, 2nd and 5th order integrator comb filter functions, programmable decimation, RAM coefficient filtering, etc.

These digital down-converters take in over sampled wide band 12 bit data at up to 20 MHz. Each one selects a narrow band signal out of the wide band data and decimates the data down to greater than 12 bits of precision depending on the amount of over sampling. The output data rate depends on the bandwidth of the selected signal. This feature is critical because it increases the effective dynamic range of the A/D converter thus alleviating the near/far problem common to these systems. The near/far problem occurs when trying to digitize multiple channels where one signal is much larger than the other due to range differences. 14–16 bit A/D converters that operate at high speeds may be quite costly or non-existent. The digital converters also convert the input bit steam down to 12 bit complex (In phase and Quadrature) words at, preferably, a variable rate selected in proportion to the expected incoming data rate, specifically the rate of 96 Kbps in one embodiment. These complex words are forwarded to DSP (405).

The processor (401) includes multiple DSPs, preferably, the Analog Devices Model ADSP-21060 and ADSP-21062. These processors offer 32 bit floating point processing at up to 80 MFLOPS, 2—64K words internal dual port memorys, 2—serial ports, and 6—link ports, and 10 DMA channels. The advantage of these processors is high I/O band width without degrading computational performance. When paired with an inter-leaving sampler, the processor, for example, can process two or more data streams independently. The enabling features are the 10 DMA channels and large internal memory.

These DSP's include a memory (410) that is utilized for storing software routines that are selectively executable. These software routines operate to demodulate and decode signals having various modulation formats. Additionally the processor (401) includes a buffer used for storing a signal specifically a portion of a signal having a particular modulation format. From the buffer the signal may be processed in accordance with particular software routines representative of a given modulation format. The correct routines are preferably selected to correspond to a modulation identifier obtained from a forward channel or network channel signal.

However in the further alternative embodiment the processor including the flexible resources processes the signal in accordance with each of the plurality of modulation formats so as to differentiate the proper modulation format. Having done so the controller then deploys the flexible resources in accordance with this modulation format and the remaining or further signals having this modulation format may be received, demodulated, and decoded without further scanning or searching for a legitimate modulation format. More specifically the software routines are sequentially loaded and executed in correspondence to each one of a finite set of modulation formats until the resulting processed or demodulated and decoded signal is legitimate or valid. In a sense the receiver scans for a valid modulation format if a valid modulation identifier is not available. This scanning approach can be particularly advantageous for demodulating and decoding a reverse channel signal of unknown origin such as PMU (113) with one of several different and distinct modulation formats.

The network processor, preferably, a Motorola model MC68360, 32 bit processor executing appropriate software routines readily written by one of ordinary skill in the art, operates at up to 4.5 MIPS and interfaces to the network channel. This network channel is preferably a leased telephone circuit, however a dial-up telephone circuit, a digital circuit, a packet switched circuit or even RF link, etc. will serve equally well. This network channel may route modulation identifier information to the receiver or serve as the return path to the system controller.

The controller (403), preferably based on a Motorola MC68360 generally handles or controls the various functions of the radio. This includes deploying the flexible resources associated with the processor (401) and setting the operating frequencies and bandwidths of the radio processing circuitry. Generally the controller (403) executes software routines commonly identified as radio operating systems that are understood. In receivers, using the optional GPS time base the controller will provide this interface and synchronization functions.

Figure 2:
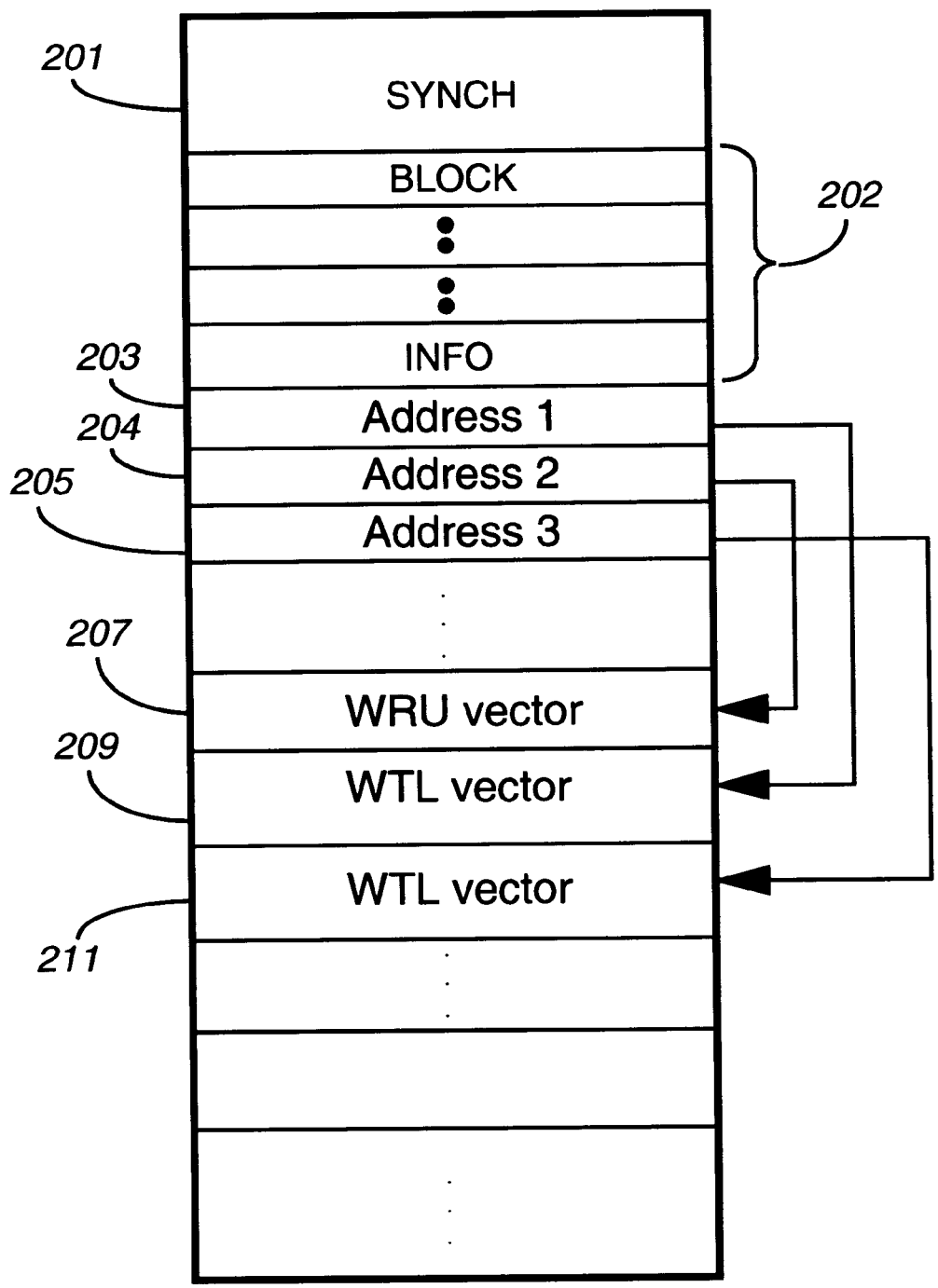
FIG. 2 depicts a channel protocol snipet suitable for use in the FIG. 1 system.

FIG. 2 shows in representative form a forward channel frame structure common in the FLEX™ family of protocols that have been defined, developed, and are maintained by Motorola. The controller vis-à-vis all of the transmitters and the forward channel informs the relevant PMUs (113) that they will receive a message or are otherwise expected to respond by, for example, registering with the system using, preferably, a simulcast message formatted as depicted. A synchronization field (201) allows a receiver monitoring the forward channel to synchronize to the forward channel and a block information field (202) provides various other system protocol related information required for proper PMU operation all as well known and not further relevant hereto. A plurality of address fields (203, 204, 205) contain the unique addresses or IDs for particular PMUs and a pointer to a corresponding vector or information fields (207, 209, 211). The vector field (207) contains all the information needed for the PMU addressed in address field (203) to receive the forthcoming message and return an acknowledgment of receipt. The simulcast message will explicitly contain or imply through, preferably, a modulation identifier or alternatively the PMU's unique ID sufficient information to enable the receiver to determine how to demodulate the inbound signal. This information will vary depending on modulation format but includes, for example, modulation format; error correction code type, symbol rate, reverse channel frequency, reverse channel message transmission time; and for spread spectrum modulation a spread code; and spread code ratio.

In summary in a preferred form the receiver reads or receives the simulcast message, correlates the vectors with the IDs of the PMUs within its range, reads or obtains the modulation format and other information that tells the time and manner in which each of these PMUs should respond, and allocates or deploys the flexible resources or signal processing resources at the appropriate time to receive and demodulate the PMUs reverse channel response. Allocating or deploying the resources would, preferably, entail the following sequence of events. Deploy the flexible resources or portion thereof so as to monitor the system simulcast message; then for all PMU IDs that are expected to respond with a message within the receiver's range determine the modulation format, error correction code type, symbol rate, reverse channel frequency, reverse channel message transmission time, etc.; and assign or deploy within the appropriate time slot the signal processing resources so as to receive the reverse channel messages, freeing, if need be, resources devoted to the forward channel until the next simulcast message occurs.

Figure 3:
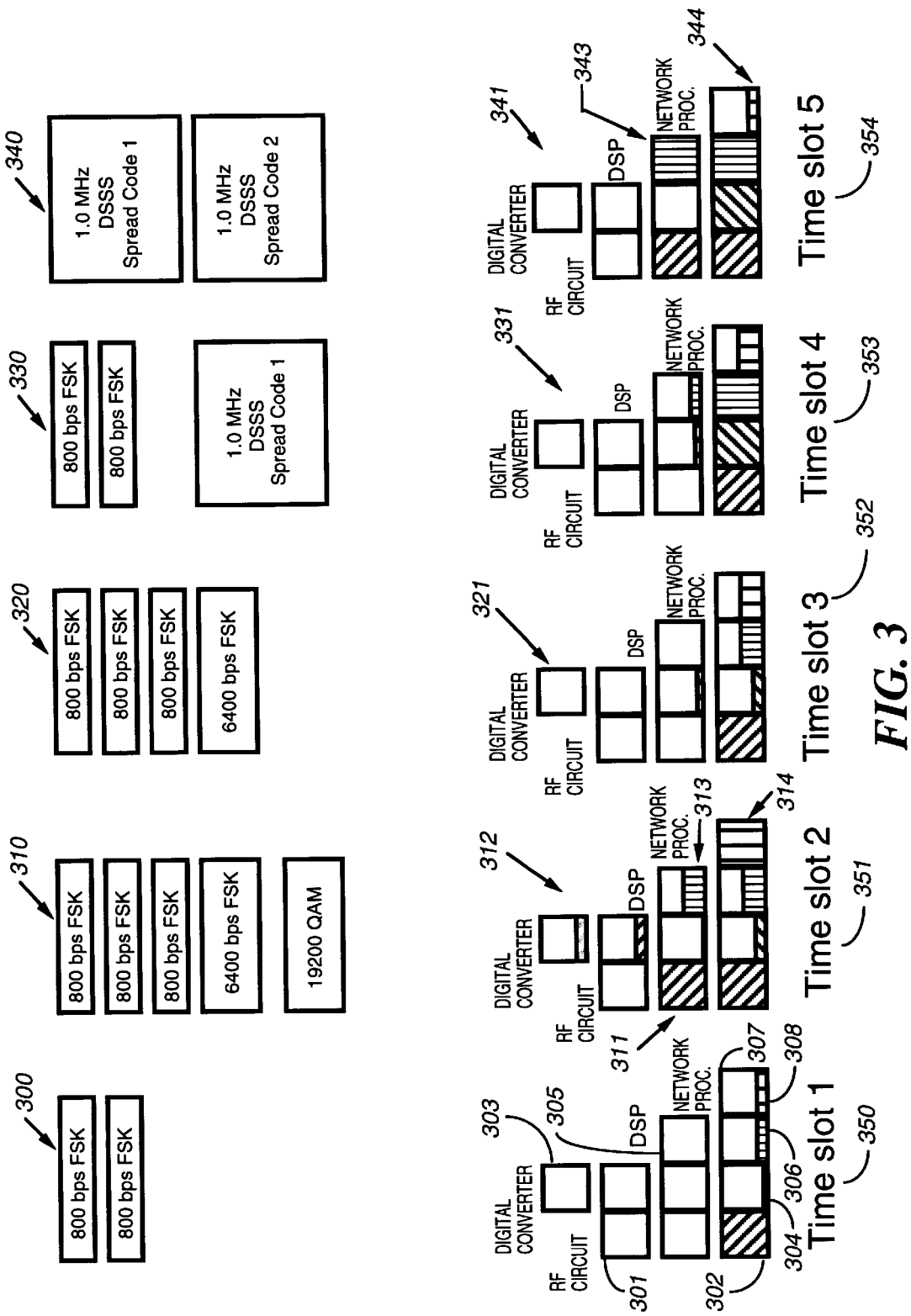
FIG. 3 depicts an example of an allocation of signal processing resources.

FIG. 3 illustrates the flexible resource allocation, in sequential time slots (350–354), of a receiver that has three RF circuits, depicted by the three boxes (301), covering the frequency range of 500 to 1000 MHz, four digital down converters, depicted by the four boxes (303), each with a bandwidth of 1 Mhz, two digital signal processors (DSPs), depicted by the two boxes (305), each with a processing capacity of 100 million operations per second, and one network processor, depicted by the boxes (307) with a processing capacity of 25 million instructions per second. In time slot one it is necessary to receive two 800 bit/second frequency shift keyed (FSK) signals (300). This requires one RF circuit, depicted by the shaded portion (302) of the three boxes (301), a part of one digital down converter, depicted by shaded area (304), a part of one DSP, depicted by shaded area (306), and a part of one network processor, depicted by shaded area (308).

In time slot 2 there are three 800 bps FSK signals, a 6400 bps FSK signal, and a 19200 quadrature amplitude modulated (QAM) signal (310) all to be received and demodulated. The additional signals require more from the system: Two RF front ends (311) are necessary; a part of four, for example, digital down converters (312) are used; the FSK signals are demodulated by a portion of one DSP (313) and the QAM demodulated is performed by part of another (313), and the network is more utilized from the increased number of reverse channel signals (314). In time slot 3 the 19200 QAM is no longer present and the resources are allocated as depicted (321). Allocation or deployment of resources for the most part refers to the portion of processing capacity or bandwidth used for a particular function.

In time slot 4 (353) two 800 bps FSK signals and one 1.0 Mhz DSSS spread code one signal (330) are present and need to be received. In this case the flexible resources deployed (331) include an RF circuit, a down converter, and a DSP for the DSSS signal in addition to the requirements from time slot 1 (350). In time slot 5 (354), two spread-spectrum signals (340) are being received and the flexible resources are accordingly deployed (341). If the two occupy contiguous spectrum, it may be possible to fit both signals on one RF front end and one digital down converter. Two DSPs will be necessary due to the computationally intensive nature of spread-spectrum computing, conversely, the amount of network processing needed is small since only two messages are arriving. In summary at each time slot boundary the flexible resources including the radio frequency (RF) circuitry is assigned or deployed by the controller or controller in conjunction with the processor in order to accommodate the next time slots needs.

Figure 5:
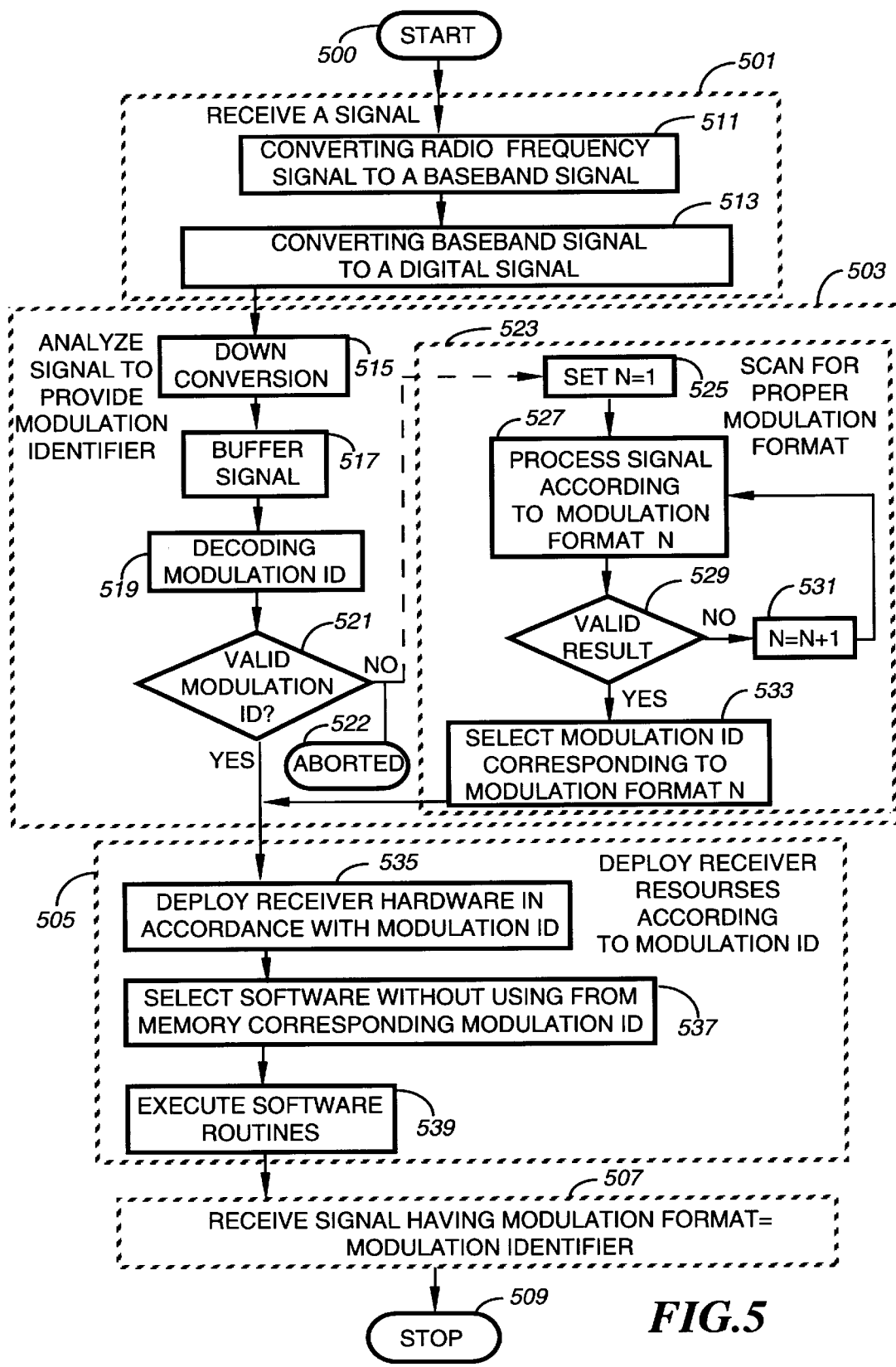
FIG. 5 depicts a flowchart of a preferred method of operation of the FIG. 3 messaging receiver.

Referring to FIG. 5, a method embodiment in accordance with the instant invention will be reviewed. This process is set in a messaging receiver that has flexible resources and that is adaptable to a plurality of modulation formats. The depicted process, beginning at step (500), provides a method of configuring the messaging receiver and in summary includes the steps of receiving a signal at step (501) that after analysis at step (503) yields or provides a modulation identifier; and deploying the flexible resources responsive to or according to the modulation identifier at step (505). That done, the receiver is prepared to receive a further signal having a modulation format equivalent to the modulation identifier at step (507) and the process ends at (509).

Step (501), preferably, includes receiving the signal as a radio signal from the forward channel although alternatively the signal may be received on the reverse channel. As an additional alternative the signal may be received over the network channel via the network processor. In the preferred or first alternative form step (501) further includes converting the radio frequency signal to a baseband signal at step (511) by for example processing the radio frequency signal through the radio frequency circuits. Step (513) converts this baseband signal to a digital signal or sampled data signal by preferably applying the baseband signal to the analog to digital converter.

Step (507), in the preferred form or first alternative form where a radio frequency signal is received from, respectively, the forward or reverse channel, includes a step (515) of down converting the digital signal to a lower rate complex signal suitable for processing by a DSP based processor. Once down-converted, the down converted signal is stored or buffered at step (517). Then step (519) results in demodulation of the buffered signal, preferably in accordance with a known or default modulation format and decoding an included modulation identifier. If the modulation identifier, thus modulation format of the digital signal is not identified at step (519) as tested at step (521), the process is aborted at step (522).

In an alternative embodiment optional step (523) will scan the buffered signal for a proper or legitimate modulation format from a finite set of possible modulation formats to thus differentiate the proper or correct modulation format for this signal. This will be particularly advantageous in a selective messaging system with a plurality of known modulation formats on the reverse channel. The system may be adapted to any of these known formats if the base receivers can determine what modulation format is being used, thus facilitating PMU originated messages. This scanning procedure begins with step (525) where a pointer, N, is set to one or the next possible modulation format. The process continues at step (527) when the digital signal is processed according to the modulation format "N". If a valid result is not obtained as tested by performing a well known CRC calculation at step (529) the next modulation format is selected at step (531) and steps (527, 529) are repeated until a valid result is obtained. When a valid result has been obtained a corresponding modulation identifier is selected at step (533). From earlier discussion of FIG. 3 it will be understood that the method of FIG. 5 when generalized may result in identifying a plurality of modulation Ids, the modulation formats for multiple signals all of which will need to be serviced or received in a given time frame.

In any event after step (533) or step (521) if the modulation ID is initially valid the method moves on to step (505) that includes step (535) that deploys the receiver hardware or resources in accordance with the modulation ID or IDs. Then step (537) together with step (539) operate to selectively execute appropriate software routines. Step (537) represents the operating system of the processor or controller selecting software routines that are required to demodulate and decode the various signals with their corresponding modulation formats from resident memory. These routines are executed at step (539). This selective execution of the appropriate software routines facilitates step (507) where a signal with the corresponding modulation format is received.

Figure 6:
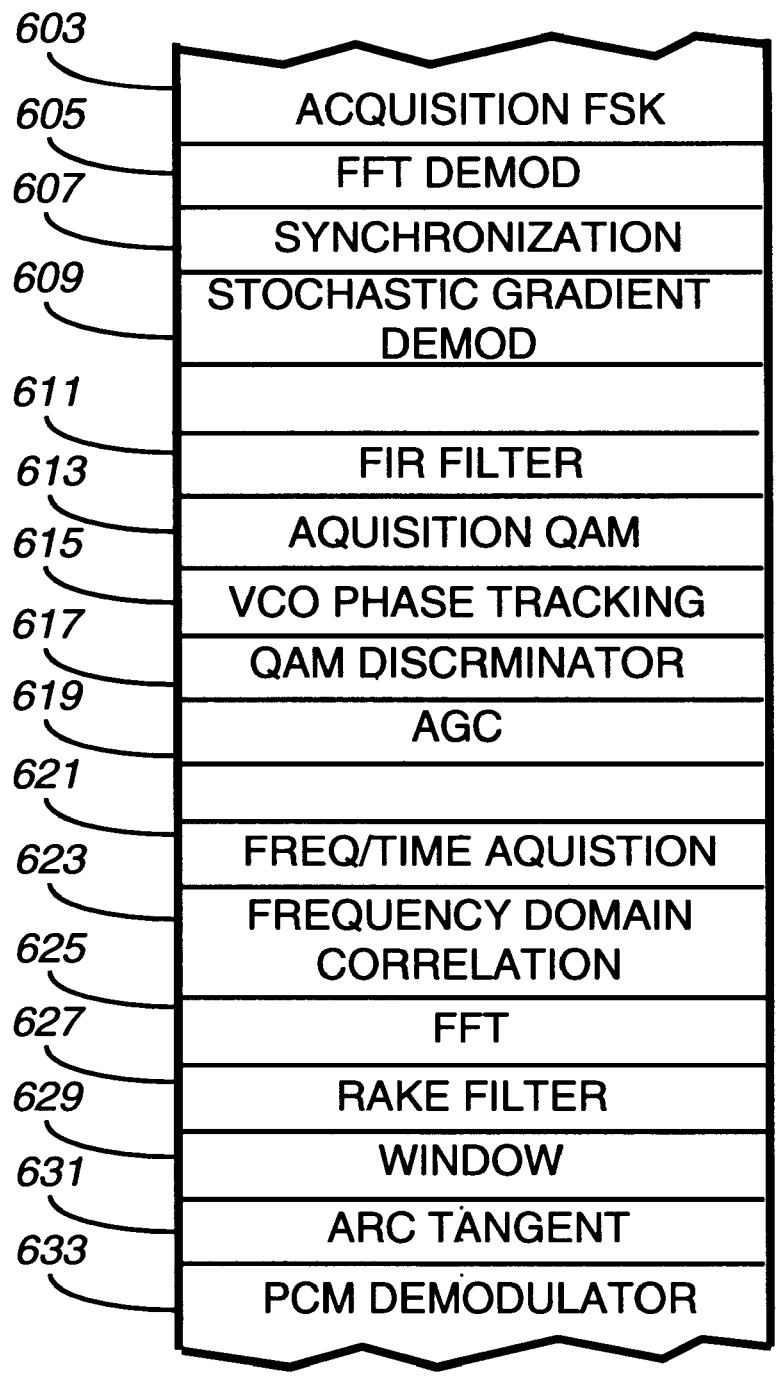
FIG. 6 depicts in representative form a memory map including software routines utilized for demodulating distinct modulation formats stored in a memory of the FIG. 4 messaging receiver.

Referring to the FIG. 6 depiction of a representative memory map (600) of the memory (410) a brief discussion of the software routines generally used to demodulate various examples of modulation formats will be provided. These software routines are written to be executed, if invoked, on the DSP (405). The underlying algorithms executed by the software routines are generally known and readily written by one of ordinary skill in the art. Execution of the appropriate software routines will demodulate and decode the complex words provided to DSP (405) into respective information or data words for subsequent forwarding to the system controller (107) by the network processor (418).

For demodulation of FSK signals, after a FSK acquisition routine (603) for establishing and fine tuning a frequency and time reference a decision between low speed, for example 800 Bps and high speed 9600 Bps data rates is made with the aid of the finite impulse response (FIR) filter routine (611). If low speed, a well known non-coherent matched filter, such as a Fast Fourier Transform demodulation routine (605) is executed followed by a protocol synchronization and decoding routine (607) to provide data words. If high speed, a stochastic gradient demodulation routine (609) is executed. This routine is described in co-pending application bearing Ser. No. 08/401467, now U.S. Pat. No. 5,566,213 titled "A Selective Call Receiving Device With Improved Symbol Decoding and Automatic Frequency Control", filed Mar. 9, 1995, by Carsello and assigned to the same assignee as here, which application is hereby incorporated herein by reference. This routine (609) yields data words.

For demodulation of quadrature amplitude modulated (QAM) signals, different software routines as well as the FIR filter routine (611) are required. A QAM acquisition routine (613) is executed for providing and tracking frequency and time reference for this modulation format. Demodulation of a QAM signal requires phase tracking accomplished by a VCO phase tracking routine (615) and automatic gain control as effected by the AGC routine (619). The QAM discriminator or demodulator routine (617) produces demodulated data. Generally demodulation of a QAM signal is well known and not further discussed.

Demodulation of a DSSS signal is accomplished by the routines (621–631) and the FIR routine (611) appropriately utilized. Routine (621) provides frequency and time acquisition for the DSSS signal after which a frequency domain correlation routine (623) is executed. Resultant signals are processed by an FFT routine (625), rake filter routine (627) to provide the relative benefits of time diversity, and window filtering or weighting routine (629). An inverse or arc tangent routine (631) operates on the resultant complex components from the window routine (629) to provide pulse coded modulated data. This routine is described in co-pending application bearing Ser. No. 08/547354, now U.S. Pat. No. 5,674,247, titled "Method And Apparatus For Interference Suppression In Spread Spectrum Signals", filed Oct. 24, 1995, by Souissi et al and assigned to the same assignee as here, which application is hereby incorporated herein by reference. This PCM data is demodulated by the PCM demodulator routine (633) to provide data words.

It is understood that these are merely exemplary of various modulation formats that may be properly demodulated or otherwise dealt with and that many others are equally well demodulated by these or other software routines readily written by one of ordinary skill in the art.

It will be appreciated by those of ordinary skill in the art that the apparatus and methods disclosed provide various approaches for adapting to and receiving a signal with varying modulation formats concurrently on a time slot by time slot basis without compromising any signal or system characteristics with the sole limitation being the state of the art for processing resources such as DSPs. These inventive structures and methods may be readily and advantageously employed in a selective messaging system, base receiver or other messaging receiver or system or in situations characterized by the existence of a plurality of overlapping RF coverage systems offering distinctly different services to provide a general purpose software based receiver adaptable to a plurality of modulation formats and corresponding methods or reception. Hence, the present invention, in furtherance of satisfying a growing need in wireless communications, readily facilitates, for example, systems and subscriber is units using diverse communications modulation formats. Such inventive principles may be advantageously used to provide greater life expectancy for systems and subscriber units or lower life cycle costs in circumstances of rapid technological change.

It will be apparent to those skilled in the art that the disclosed invention may be modified in numerous ways and may assume many embodiments other than the preferred forms specifically set out and described above. For example many of the inventive procedures and apparatus described in a preferred form for selective messaging systems will work equally well for other communications systems, for example. Accordingly, it is intended by the appended claims to cover all modifications of the invention which fall within the true spirit and scope of the invention.

What is claimed is:

1. A messaging receiver adaptable to a plurality of modulation formats comprising;
    a processor, coupled to an antenna and including flexible resources, for receiving from a forward channel, a signal to provide a modulation identifier, and
    a controller, coupled to said processor, for deploying said flexible resources responsive to and in accordance with said modulation identifier so as to receive a further signal from a reverse channel having a modulation format corresponding to said modulation identifier.

2. The messaging receiver of claim 1 further including radio frequency circuitry coupled from said antenna to said processor for converting a radio frequency signal to said signal.

3. The messaging receiver of claim 2 wherein said radio frequency circuit further includes an analog to digital convertor for converting said signal to a digital signal.

4. The messaging receiver of claim 3 wherein said flexible resources of said processor include a digital signal processor and a memory for storing software routines that are selectively executed.

5. A messaging receiver adaptable to a plurality of modulation formats comprising, a processor, coupled to an antenna and including flexible resources, for receiving, from a network channel, a signal to provide a modulation identifier, and a controller, coupled to said processor, for deploying said flexible resources responsive to and in accordance with said modulation identifier so as to receive a further signal from a reverse channel having a modulation format corresponding to said modulation identifier.

6. The messaging receiver of claim 5 further including radio frequency circuitry coupled from said antenna to said processor for converting a radio frequency signal to said further signal.

7. The messaging receiver of claim 6 wherein said radio frequency circuit further includes an analog to digital convertor for converting said further signal to a digital signal.

8. The messaging receiver of claim 7 wherein said flexible resources of said processor include a digital signal processor and a memory for storing software routines that are selectively executed.

9. A selective messaging system having a forward channel and a reverse channel, the reverse channel employing a plurality of modulation formats, the system comprising in combination;

a system controller, coupled to a message source, arranged and constructed for controlling a plurality of transmitters, a transmitter, coupled to said controller, for transmitting a forward channel signal suitable for reception by a selective messaging receiver, and a base receiver, coupled to said controller and including flexible resources, for receiving a message indicative of a modulation format from the forward channel or from a network channel, configuring said flexible resources in accordance with said modulation format, and receiving a reverse channel signal having said modulation format originating from said selective messaging receiver to provide a received signal to said system controller.

10. The selective messaging system of claim 9 wherein said base receiver receives said message including a modulation identifier and said flexible resources are deployed in accordance with said modulation identifier so as to receive a further signal from the reverse channel having said modulation format corresponding to said modulation identifier.

11. The selective messaging system of claim 10 wherein said base receiver further includes, intercoupled, an antenna, a radio frequency circuitry for converting a radio frequency signal to said further signal, and a processor including said flexible resources for receiving said further signal.

12. In a messaging receiver having flexible resources adaptable to a plurality of modulation formats a method of configuring the messaging receiver including the steps of;

receiving a signal from a forward channel or network channel to provide a modulation identifier; and deploying the flexible resources responsive to said modulation identifier so as to receive a further signal on a reverse channel having a modulation format corresponding to said modulation identifier.

13. The method of claim 12 further including steps of;

first converting a radio frequency signal to said signal, second converting said signal to a digital signal, and wherein said step of deploying further includes a step of selectively executing software routines from a memory thereby facilitating said step of receiving said further signal having said modulation format.

14. In a selective messaging system having a forward channel and a reverse channel, a method of adapting the selective messaging system to a plurality of modulation formats on the reverse channel;

transmitting, responsive to a system controller, a forward channel signal suitable for reception by a selective messaging receiver, and receiving, at a base receiver from the forward channel or a network channel, a message indicative of a modulation format, configuring said base receiver in accordance with said modulation format, receiving a reverse channel signal having said modulation format, said reverse channel signal originating from said selective messaging receiver, to provide a received signal to said system controller.

15. The method of claim 14 wherein said step of receiving said message includes receiving a modulation identifier from the forward channel and said step of configuring includes deploying flexible resources at said base receiver in accordance with said modulation identifier so as to receive a further signal having a modulation format corresponding to said modulation identifier.

16. The selective messaging system of claim 14 wherein said step of receiving said message includes receiving a modulation identifier from a network channel and said step of configuring includes deploying flexible resources at said base receiver in accordance with said modulation identifier so as to receive a further signal having a modulation format corresponding to said modulation identifier.

* * * * *